UNITED STATES PATENT OFFICE.

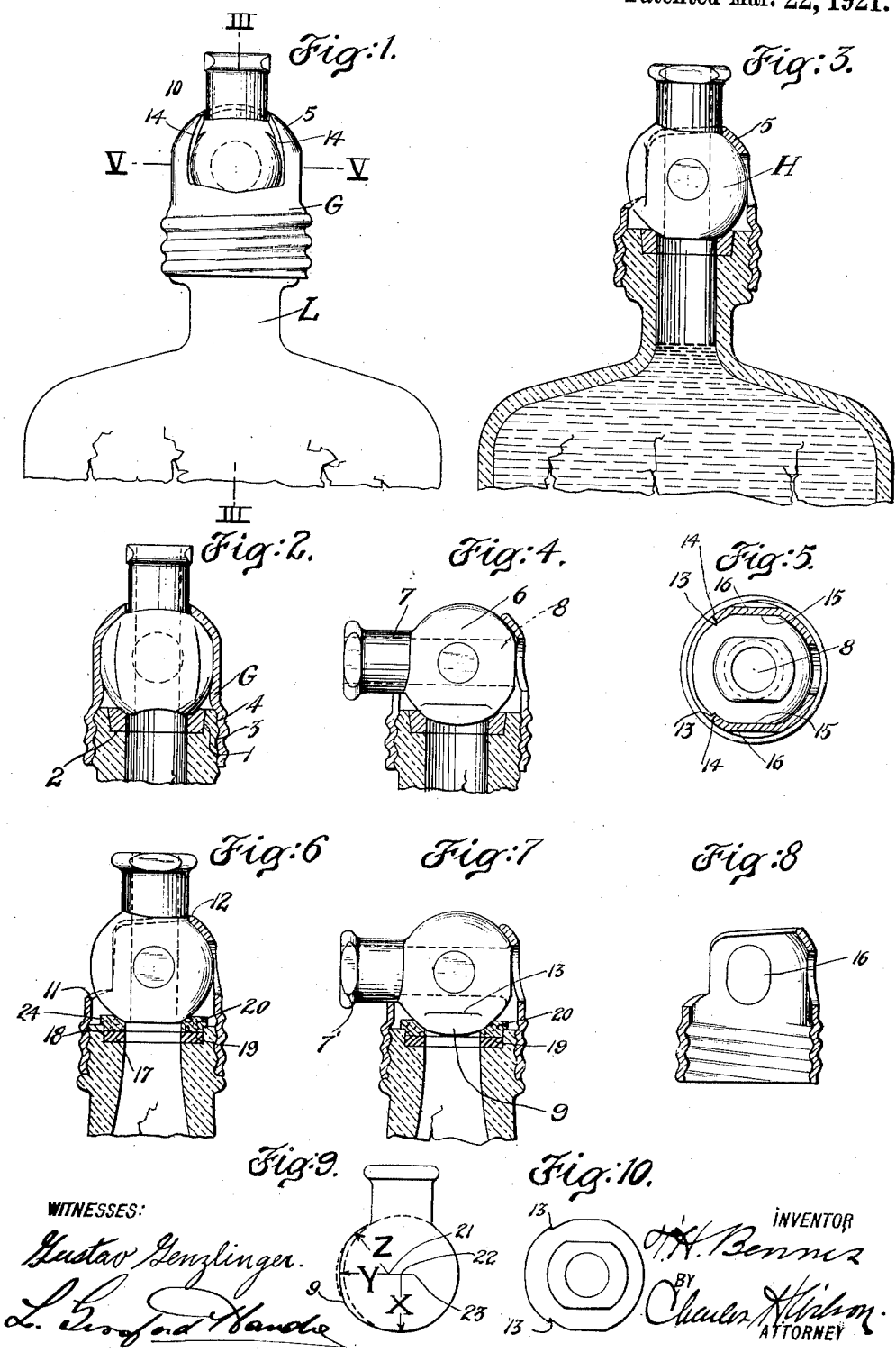

THOMAS H. BENNIS, OF BROOKLYN, NEW YORK.

CLOSURE DEVICE.

1,372,115.  Specification of Letters Patent.  Patented Mar. 22, 1921.

Application filed February 8, 1916. Serial No. 76,932.

*To all whom it may concern:*

Be it known that I, THOMAS H. BENNIS, residing at Brooklyn, in the county of Kings and State of New York, have invented certain new and useful Improvements in Closure Devices, of which the following is a specification.

This invention relates to a closure device for bottles and like receptacles.

The object of the invention is to provide a closure which may be retained at all times upon the receptacle and which is adapted to be manipulated as a valve to open and close the receptacle, the device being also adapted preferably to provide a convenient, efficient and adjustable pour-out or discharge nozzle for the receptacle.

A further and more detailed object is to provide a ball valve for the purpose above set forth, the ball being adapted to be rotated into open and closed position, to provide a gasket member upon which the ball engages; to provide means whereby the ball will be caused to engage with relatively greater security against the gasket member when in closed position than when in open position, and to provide means whereby the gasket will thereby afford a highly efficient seal between the ball and the adjacent part of the receptacle.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claim.

In the accompanying drawings which are to be taken as a part of this specification, and in which I have shown a merely preferred form of embodiment of the invention:

Figure 1 is a side elevational view of a bottle having a closure connected thereto in accordance with the provisions of this invention.

Fig. 2 is a view of the upper portion of the structure shown in Fig. 1, parts being shown in vertical section for disclosing the construction of the device.

Fig. 3 is a vertical central sectional view, partly in elevation, of the structure shown in Fig. 1, the section being taken substantially upon the plane of line III—III of Fig. 1.

Fig. 4 is a view similar to that shown in Fig. 2, but being taken at right angles thereto and showing the ball valve swung to closed position whereas in the previous figures said ball valve stands in open position.

Fig. 5 is a transverse sectional view, partly in elevation, the section being taken upon the plane of line V—V of Fig. 1.

Fig. 6 is a view similar to that shown in Fig. 4, except that the ball valve is shown in open position, said view illustrating a modification.

Fig. 7 is a view similar to that shown in Fig. 6, but illustrating the ball valve swung to closed position.

Fig. 8 is a detached sectional view of the housing employed to retain the ball valve upon the receptacle; and Figs. 9 and 10 are diagrammatic views graphically illustrating the shape of the ball valve.

Referring to the structure as illustrated in the drawings for a detailed description thereof, the reference character L indicates the bottle neck. This is formed interiorly with an upwardly opening conical seat 1 into which is fitted a leather, rubber, cork, or composition, gasket 2. Threads or other devices, as 3, are formed exteriorly of the neck for engagement with the coöperative parts 4 formed upon the housing G.

The housing G comprises a hollow cylindrical shell formed interiorly with the threads or other engaging means 4 at its lower end and having the upper end of its annular walls curved inwardly, as at 5, to engage over the rounding surface of the ball valve H. The ball valve H comprises preferably a substantially spherical body portion 6 and a laterally extending tubular handle spout 7. A central aperture 8 extends straight throught the body and through the spout 7.

By rotating the housing G downwardly about the threads 3 on the bottle neck the under surface portion of the body 6 is caused to engage with greater or less force against the gasket 2. This pressure may be adjusted, as will be understood.

In its normal position in use the ball valve stands with the spout 7 projecting straight upwardly and the aperture 8 registering with the opening in the bottle neck.

In its closed or sealing position the valve stands with the spout 7 extending in a horizontal plane so that an unapertured or solid exterior surface portion 9 of the valve is in position covering and closing the opening in the bottle neck.

A slot-like opening 10 is formed in the housing G to permit travel of the spout 7 from one of its positions to the other. The opposite ends, as 11 and 12 of the opening 10 serve as stops for limiting the movement of the spout 7.

In order that the ball valve may be caused to engage more firmly with the gasket 2 when swung to closed position, the portion 9 thereof, which engages the gasket and closes the opening in the bottle, is raised with respect to the remainder of the spherical surface of the valve, as is clearly shown by inspection of Figs. 9 and 10, that is to say, that the length of line X is less than the length of line Y.

In order that this raised portion 9 will always be in a position to engage the gasket when the valve is closed the opposite edge portions thereof are caused to provide shoulders 13, which stand to engage the side wall portions 14 of the opening 10 so as to prevent any rotation of the valve except such as to move it into open and closed position.

If desired other and auxiliary means may be provided to coöperate between the valve and the housing for preventing undesirable rotation. Such an auxiliary means is illustrated in the drawings as comprising flattended surface portions 15 formed upon the body H and being engaged by flattened wall portions 16 of the housing.

It will be noted from the above that although the gasket 2 may not form an absolute seal between itself and the seat 1, while the valve is in open position, nevertheless it will be caused to form such a seal when it is forced downwardly into the seat by pressure from the portion 9 of the valve. The action of the portion 9 in producing this result is an important feature in this invention and in this respect this application is similar to the structure disclosed in my copending application, Serial Number 809,457, filed December 30th, 1913.

Owing to the spherical shape of the surface portion 9, it is pointed out that the pressure which is exerted upon the gasket is not wholly directly downwardly, but that said pressure is exerted to a considerable extent in a direction substantially radially from the center of the valve so that it forces the gasket both outwardly and downwardly. The function of the conical shape of the seat is thus made apparent in that it is seen that the pressure is thus brought more nearly in a direction directly against the conical walls of the seat.

The spout 7 extends upward through the slot-like opening 10 a sufficient distance to enable it to be conveniently engaged by the finger, and at its upper end is provided with an outstanding rim or shoulder 7'. The surface of the rim or shoulder is to provide means which will prevent the finger of the operator from slipping from the spout when engaged therewith to open and close the ball valve.

In order that the ball valve or that portion thereof designated as 9, may pass more easily into sealing position without likelihood of injury to the gasket, and in order further that when in said sealing position it will seat itself more securely, it is contemplated that the portion 9 be given substantially a shape as is indicated best in Figs. 9 and 10. In these figures, particularly in Fig. 9, it is noted that the outer annular part of the portion 9 is shaped with its surface struck on the arc of a circle of slightly less radius than the circle defined by the main portion of the ball valve and that the center, as 21, of said circle is arranged slightly in front of the center, as 22, of the main portion of the ball valve. The line Z extending outwardly from the center 21 indicates the radius referred to. This annular part of the portion 9 is that part which directly engages the gasket when the ball valve is in sealing position and it is pointed out that by reason of the shape shown, said annular portion is made more abruptly conical and wedge-like so as to tend to squeeze down more tightly under a given pressure against the gasket. The central part of the portion 9, that is, the part which overlies the opening in the bottle neck when the valve is in sealing position, is flattened somewhat by being formed for instance on the arc of a circle of somewhat greater radius than the radius of the circle defined by the main ball valve and the center, as 23, of said arc being set slightly back of the center 22. By flattening out this part of the portion 9, it is contemplated that all likelihood of injury to the gasket and to the material of the bottle neck is avoided.

The modification shown in Figs. 6 and 7 contemplates only a change in the shape of the gasket seat and in the form and shape of the gasket employed. In this modification the seat, as 17, is substantially the same as that shown in the previous figures. Its outer annular wall, as 18, may be straight or conical, as desired. The gasket employed may comprise a single element, if desired, it preferably is made up, however, of a sealing member 19, which is received within the seat, and a friction member 20, which rests thereon. The member 19 may be soft and pliable, such as india rubber, while the member 20 is preferably relatively stiff and hard, such as cork, or even a soft metal. The ball valve contacts only with the member 20 and said member is adapted to withstand the friction and wear thus occasioned. The member 19 is intended to be pressed downwardly into the seat by the member 20 when the part 9 of the valve is brought into engagement therewith and said member 19 is intended to be squeezed by this pressure and caused to spread into tight engagement with the walls 18 of the seat.

The member 20 may be formed with a projecting annular portion 24 arranged to overhang and rest upon the upper surface of the bottle neck outside the gasket seat. Thus when the member 20 is squeezed downwardly by rotation of the ball valve said projecting portion also will be squeezed against the upper corner of the seat and thereby increase the efficiency of the seal.

The matter of wear and efficiency of seal is thus taken care of in a practical and satisfactory manner.

As many changes could be made in this construction without departing from the scope of the following claim, it is intended that all matter contained in the above description or shown in the accompanying drawing shall be interpreted as illustrative only and not in a limiting sense.

Having thus described my invention what I claim as new and desire to secure by Letters Patent is:

In a device of the class described, the combination with a member having an opening therein, of a ball valve engaging said member, a housing engaging between said member and said ball valve to retain said ball valve in position rotatable to open and close the opening in said member, the housing having a slot-like opening in the wall thereof, a spout formed upon the ball valve projecting laterally therefrom to traverse said slot-like opening adapted to engage the opposite end walls of said slot-like opening to limit the movement of the ball valve, and shoulders formed upon the spherical surface of said ball valve for engaging the side walls of said slot-like opening to retain the ball valve against any rotation except such as to move the same into and out of open position.

In testimony whereof I affix my signature in the presence of two witnesses.

THOS. H. BENNIS.

Witnesses:
L. GESSFORD HANDY,
EMMA WEINBERG.